(12) United States Patent
Pearson

(10) Patent No.: US 6,928,884 B1
(45) Date of Patent: Aug. 16, 2005

(54) METHOD AND APPARATUS FOR MEASUREMENT OF FLOW RATE

(76) Inventor: John J. Pearson, 201 Castle Ct., Novato, CA (US) 94945

( * ) Notice: Subject to any disclaimer, the term of this patent is extended or adjusted under 35 U.S.C. 154(b) by 0 days.

(21) Appl. No.: 10/935,778

(22) Filed: Sep. 7, 2004

Related U.S. Application Data

(60) Provisional application No. 60/500,892, filed on Sep. 4, 2003.

(51) Int. Cl.$^7$ ................................................. G01F 1/34
(52) U.S. Cl. ................................. 73/861.42; 73/861.65
(58) Field of Search ........................ 73/861.42, 861.65, 73/861.66, 861.52, 861.63

(56) References Cited

U.S. PATENT DOCUMENTS

| | | | | |
|---|---|---|---|---|
| 3,449,954 A | * | 6/1969 | Brown ..................... | 73/861.65 |
| 4,592,239 A | * | 6/1986 | Cutler ..................... | 73/861.66 |
| 5,365,795 A | * | 11/1994 | Brower, Jr. ............... | 73/861.63 |
| 6,467,359 B1 | * | 10/2002 | Atwood ................... | 73/861.63 |
| 6,622,573 B2 | * | 9/2003 | Kleven .................... | 73/861.42 |

* cited by examiner

Primary Examiner—Harshad Patel
Assistant Examiner—Corey D. Mack
(74) Attorney, Agent, or Firm—Craig M. Stainbrook; Larry D. Johnson; Johnson & Stainbrook, LLP

(57) ABSTRACT

A bi-directional, clean or grey medium, wide temperature range, low intrusion, low turbulence, mass flow meter extends multiple pressure sensing tubes, each containing multiple pressure sensing ports, into a bounded path a distance no more than one half the diameter of the path, or semi-traversing. These sensing tubes sense impact or static pressures to obtain a sensing pressure, and are in fluid communication with a channel located externally of the bounded path which provides a total average sensing pressure for measurement. A series of reference pressure ports are located flush to the wall surface of the bounded path to obtain a reference pressure. These reference ports are in fluid communication with another channel located externally of the bounded path which provides a total average reference pressure for measurement. The difference in total average sensing pressure and total average reference pressure can be measured and used to calculate the average velocity and volume of gas within the bounded path. Alternatively, the difference in total average pressures can produce a measurable sample flow through a channel connecting the two total average pressure plenums, which is proportional to the flow through the bounded path.

14 Claims, 15 Drawing Sheets

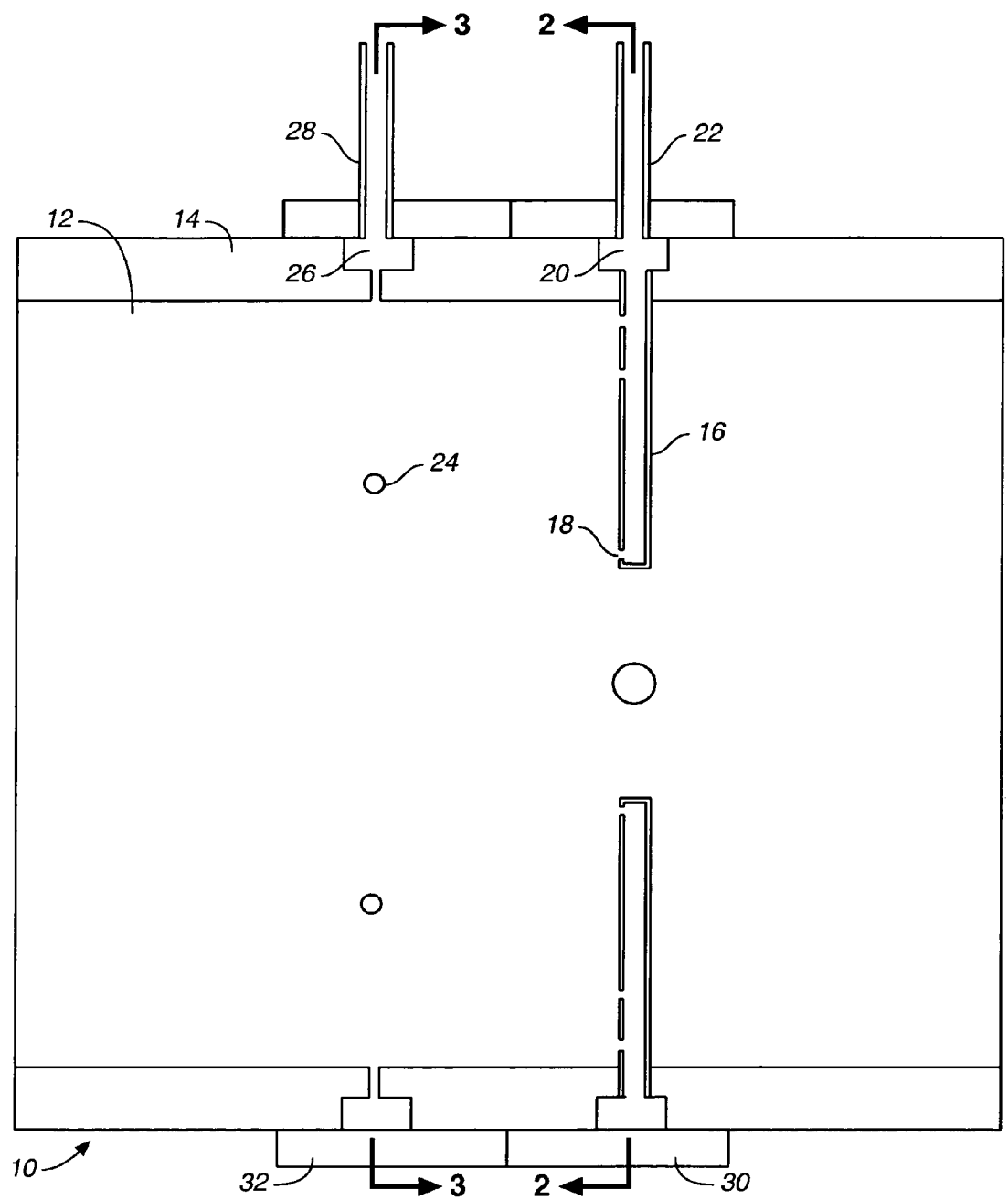
FIG._1

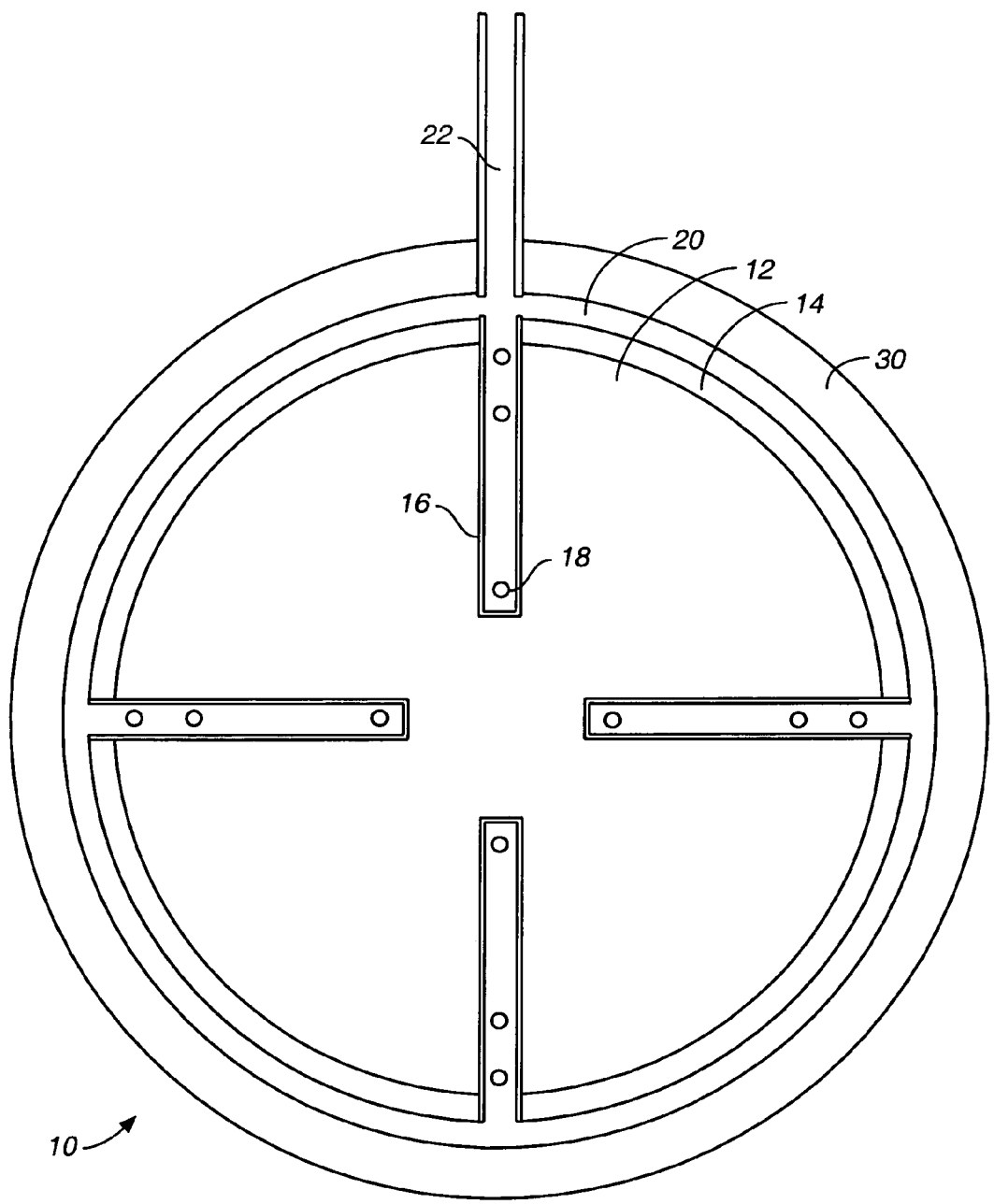
FIG._2

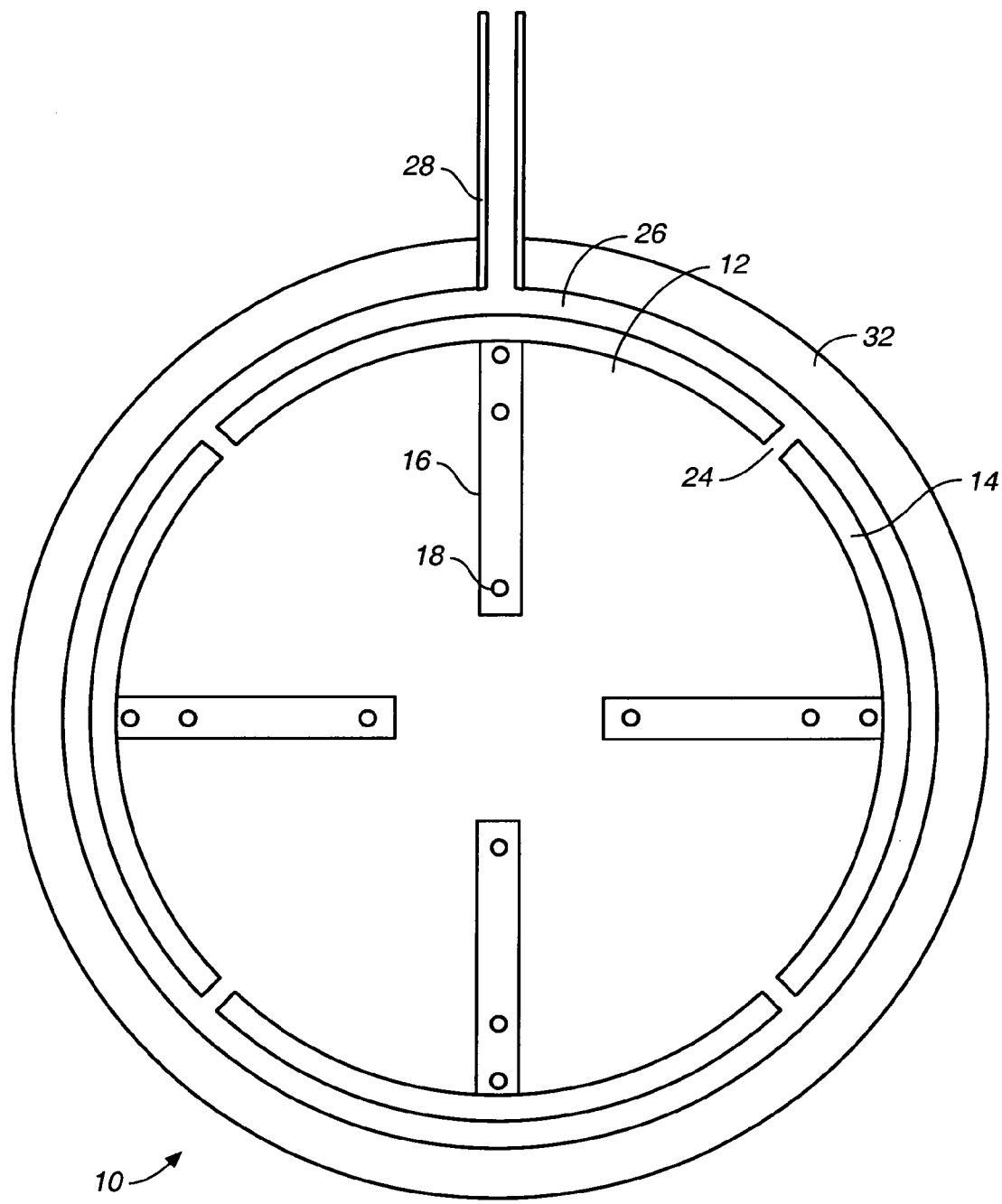
FIG._3

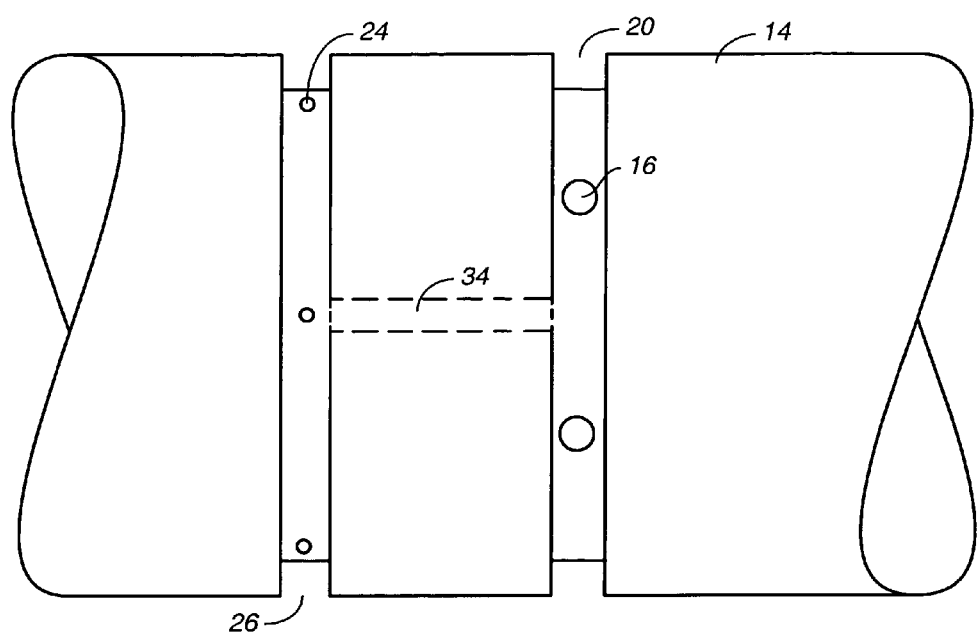
FIG._4

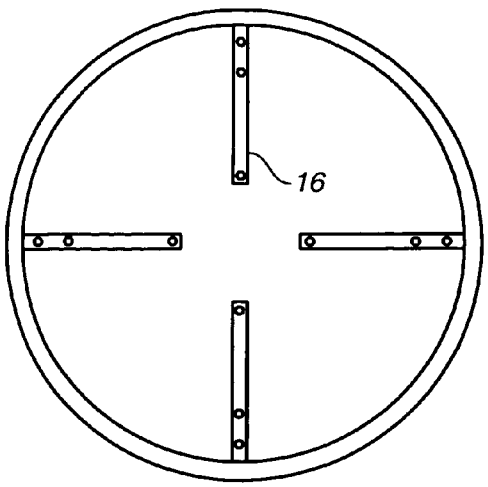
FIG._5A
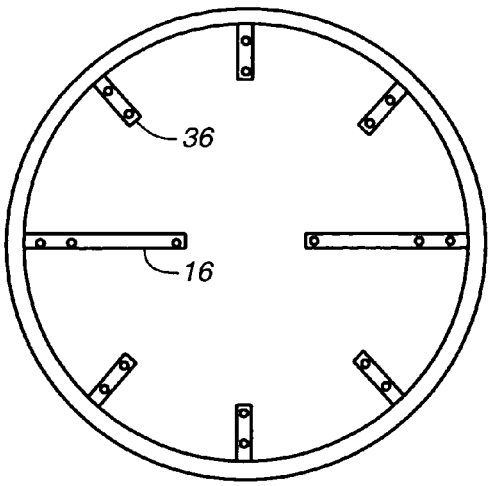
FIG._5B
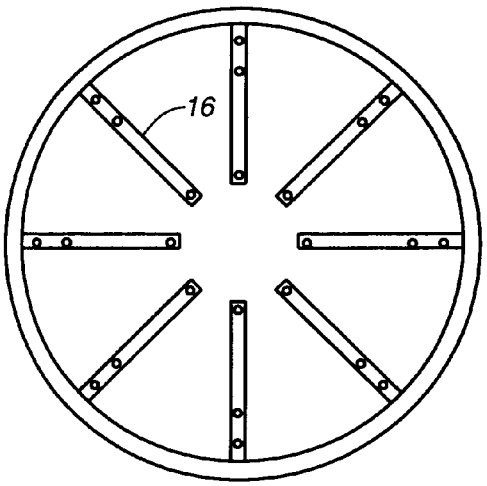
FIG._5C
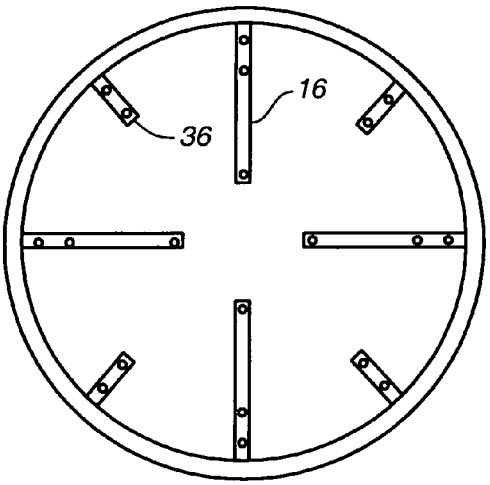
FIG._5D
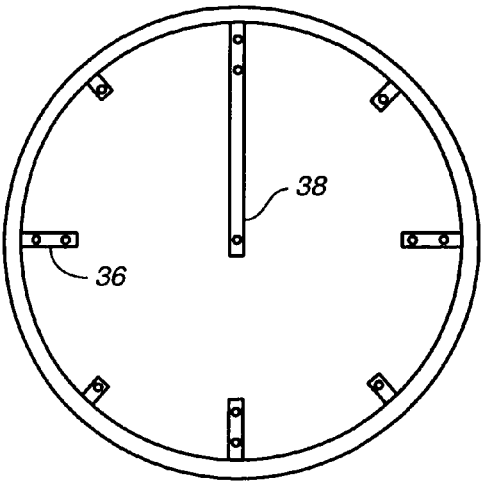
FIG._5E
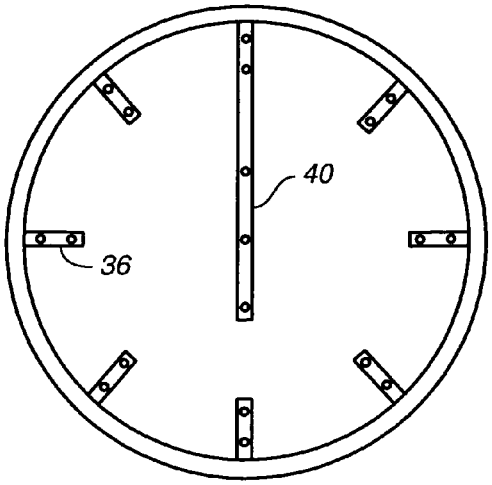
FIG._5F

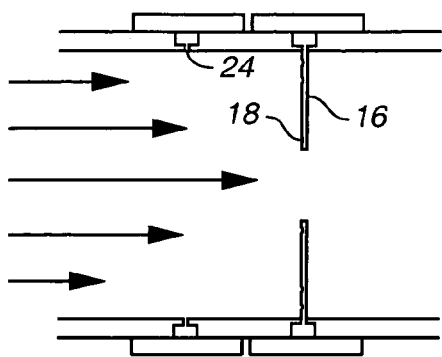
FIG._6A
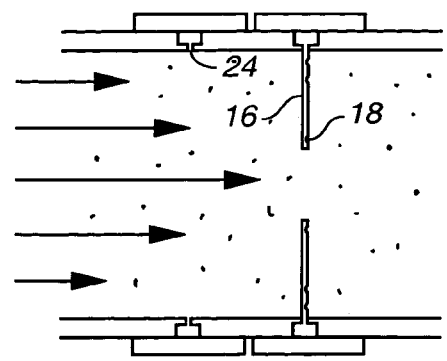
FIG._6B
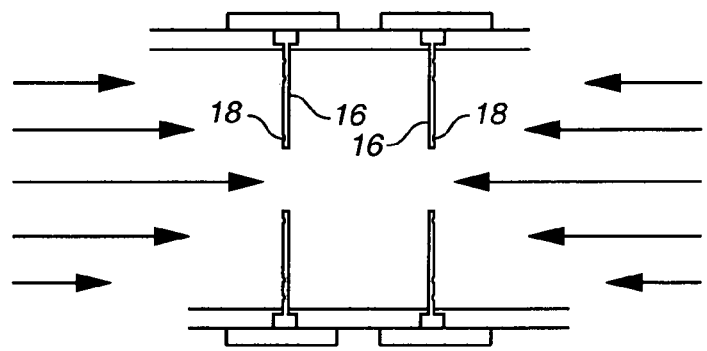
FIG._6C
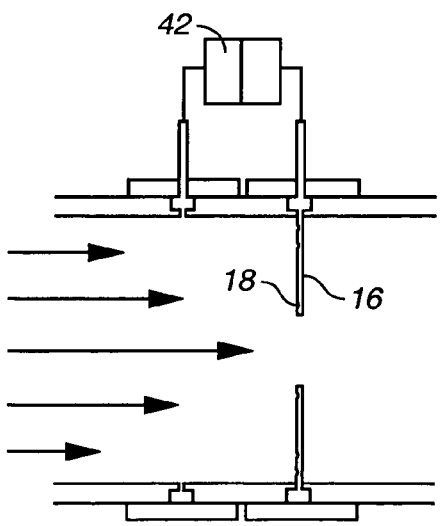
FIG._6D
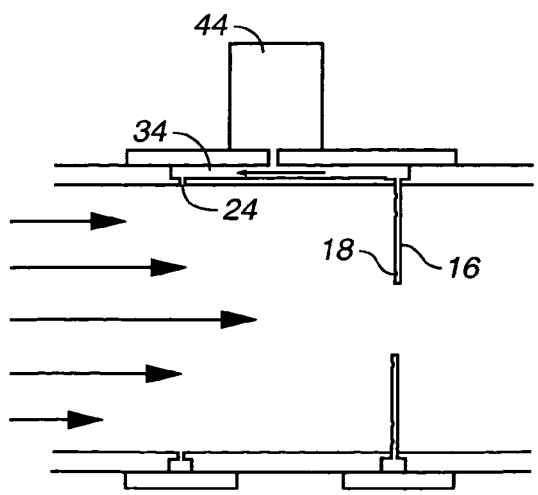
FIG._6E

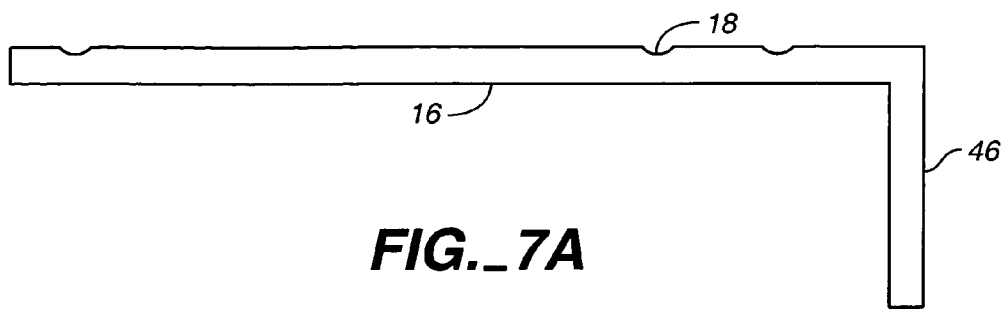
FIG._7A
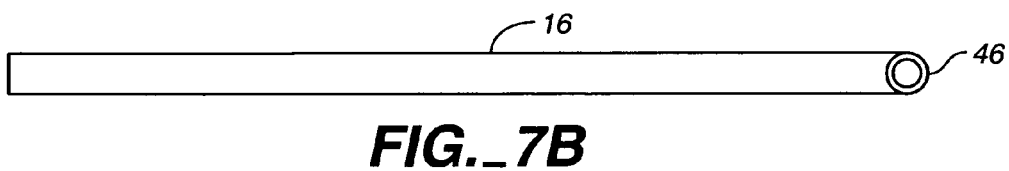
FIG._7B
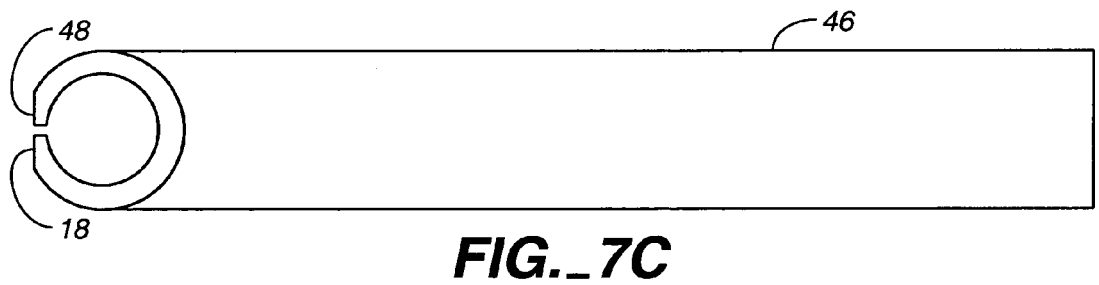
FIG._7C

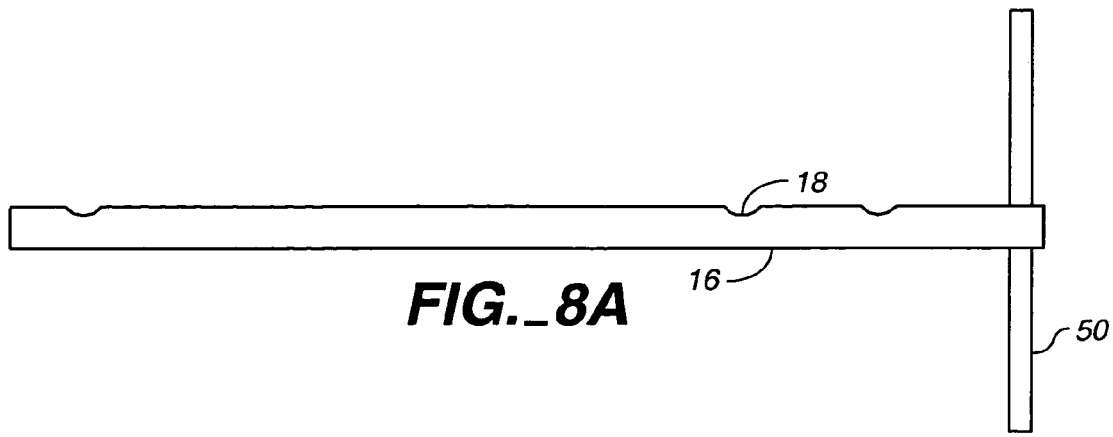
*FIG._8A*
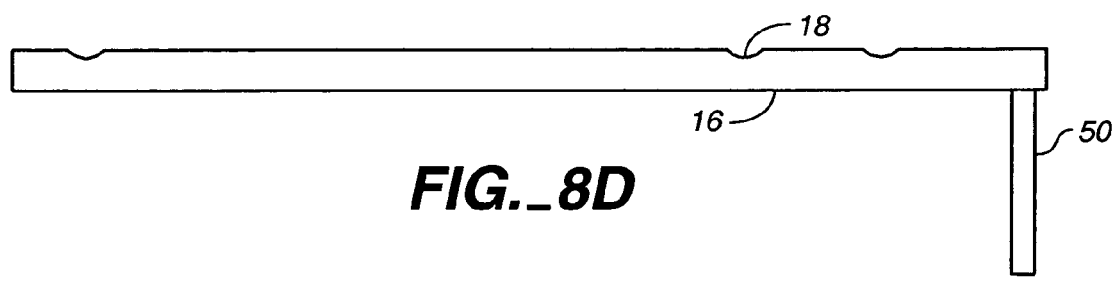
*FIG._8D*
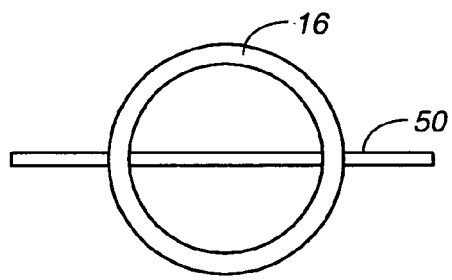
*FIG._8B*
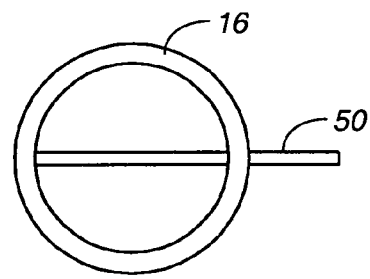
*FIG._8E*
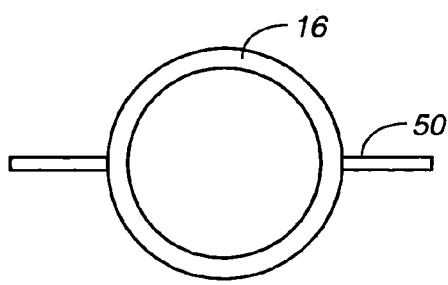
*FIG._8C*
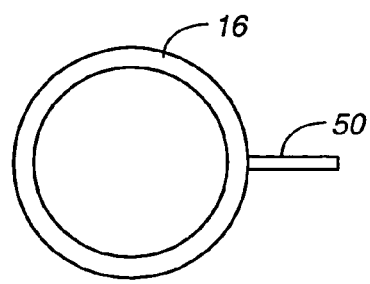
*FIG._8F*

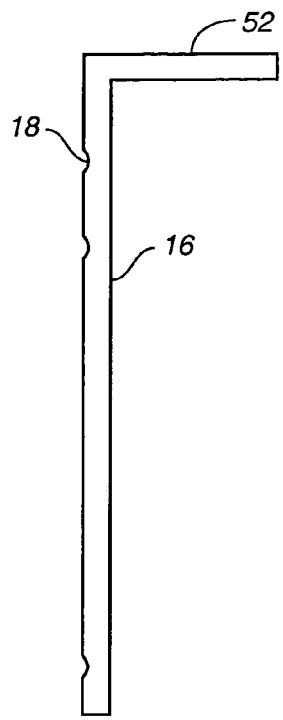
FIG._9A
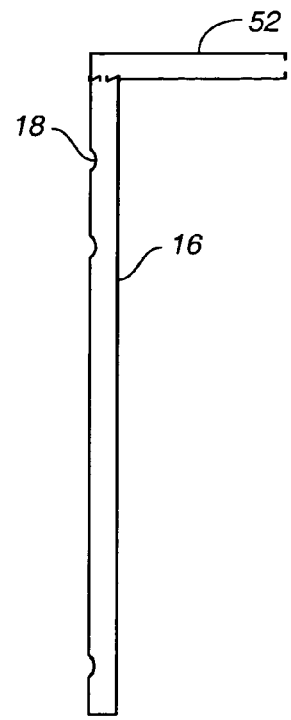
FIG._9B
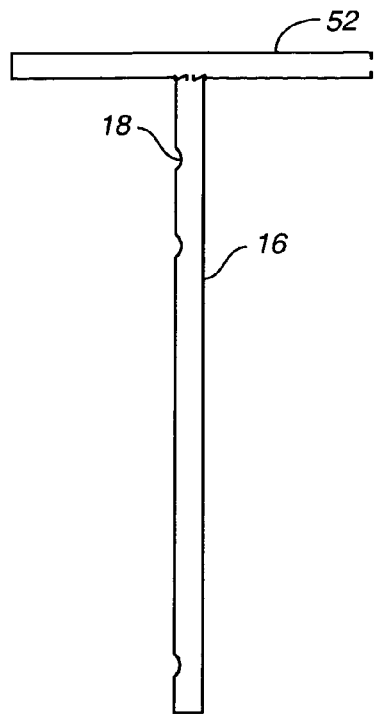
FIG._9C
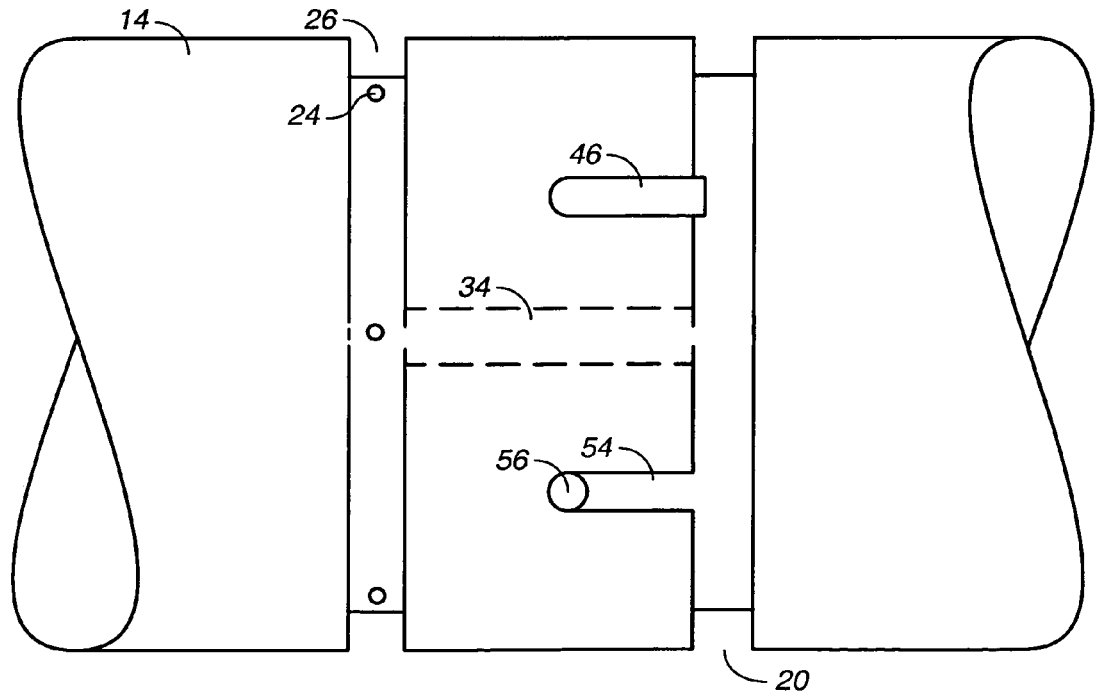
FIG._10

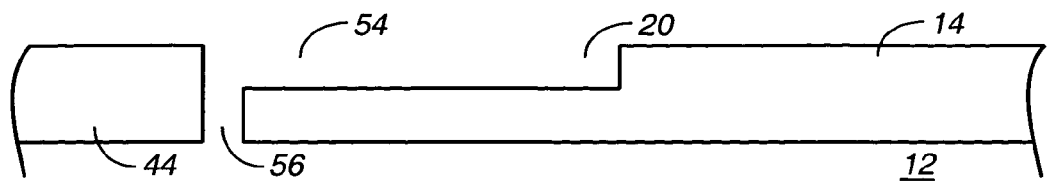
FIG._11A
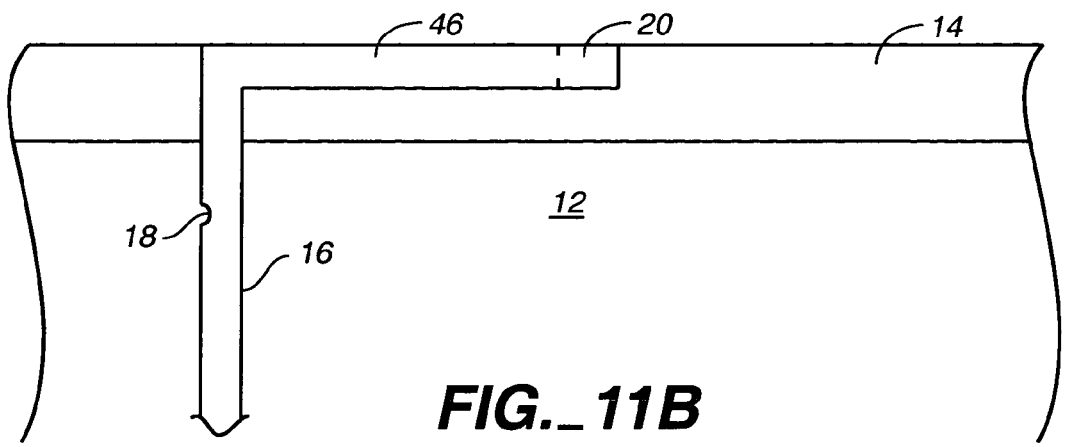
FIG._11B
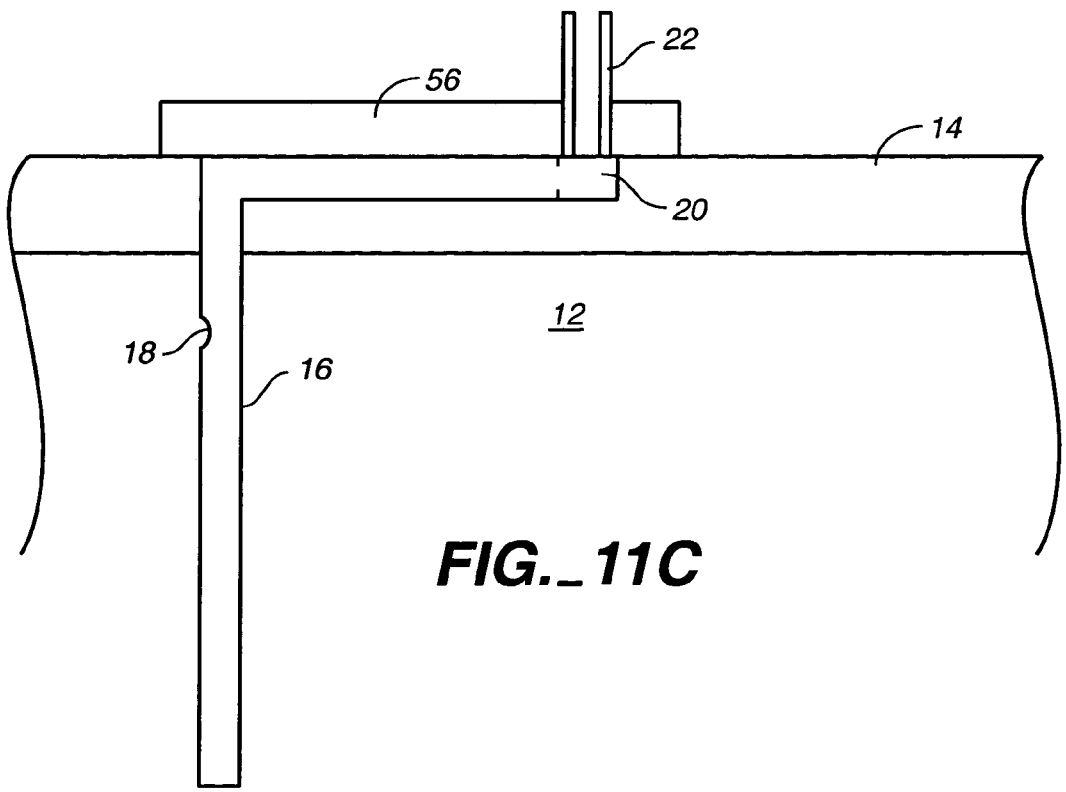
FIG._11C

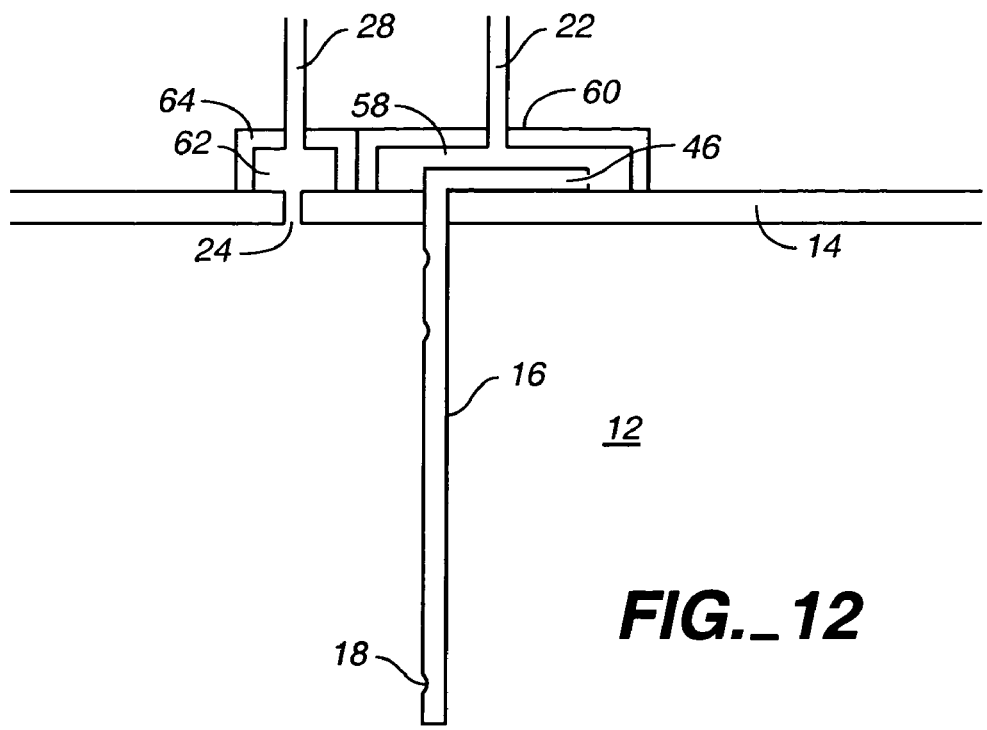
FIG._12
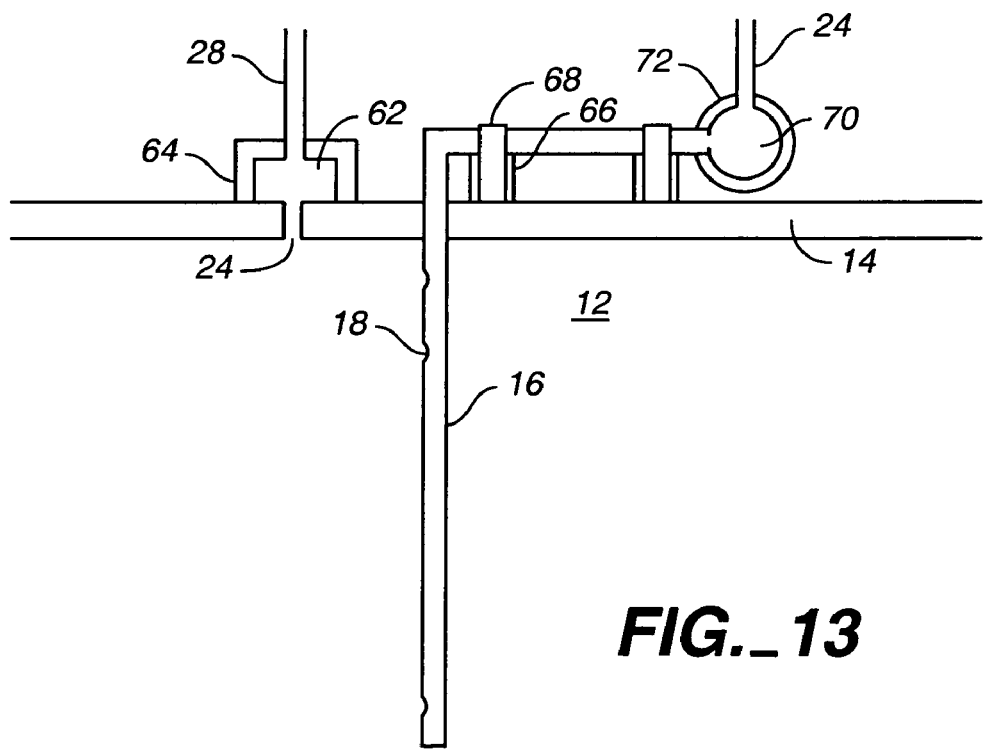
FIG._13

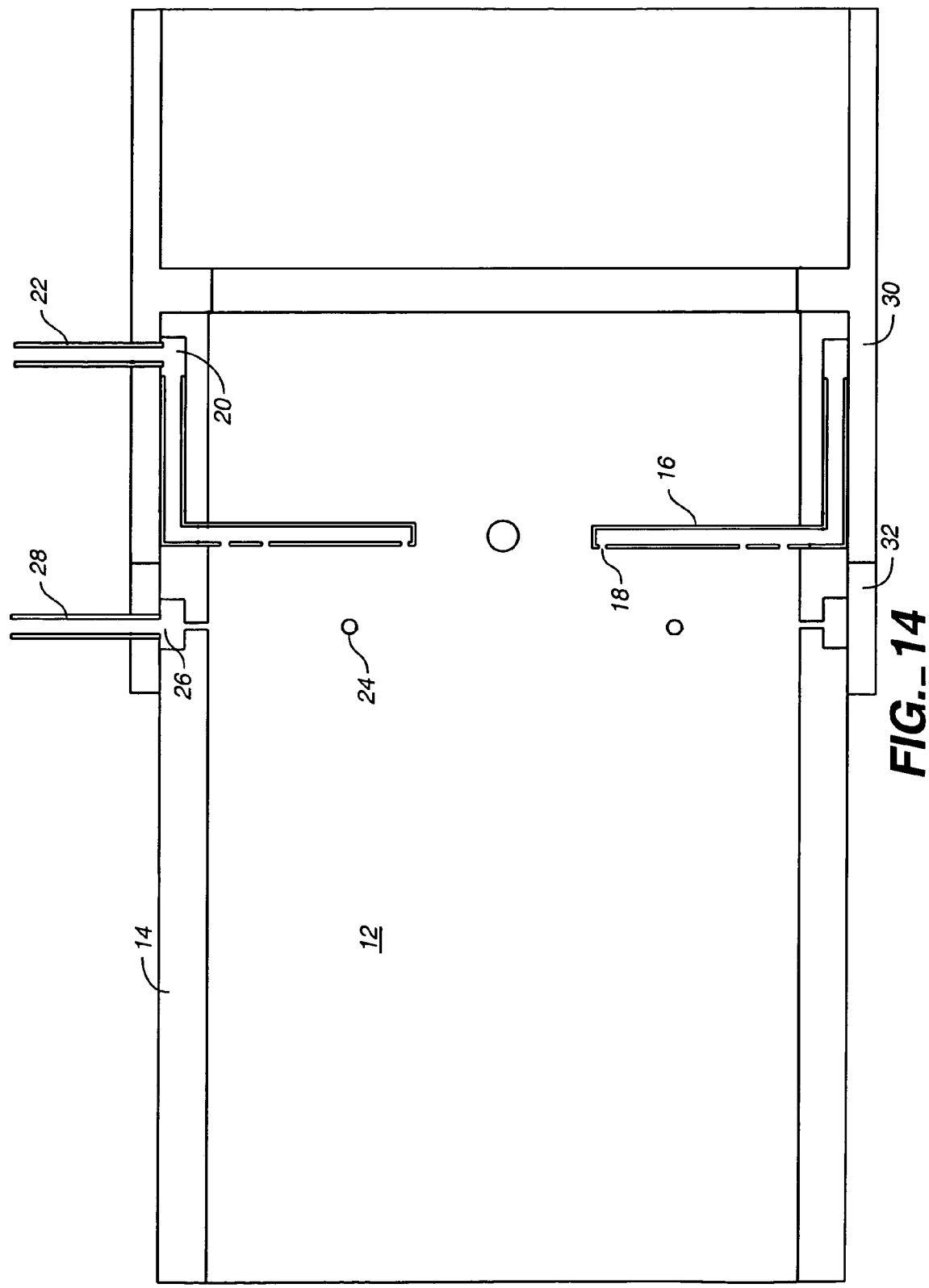

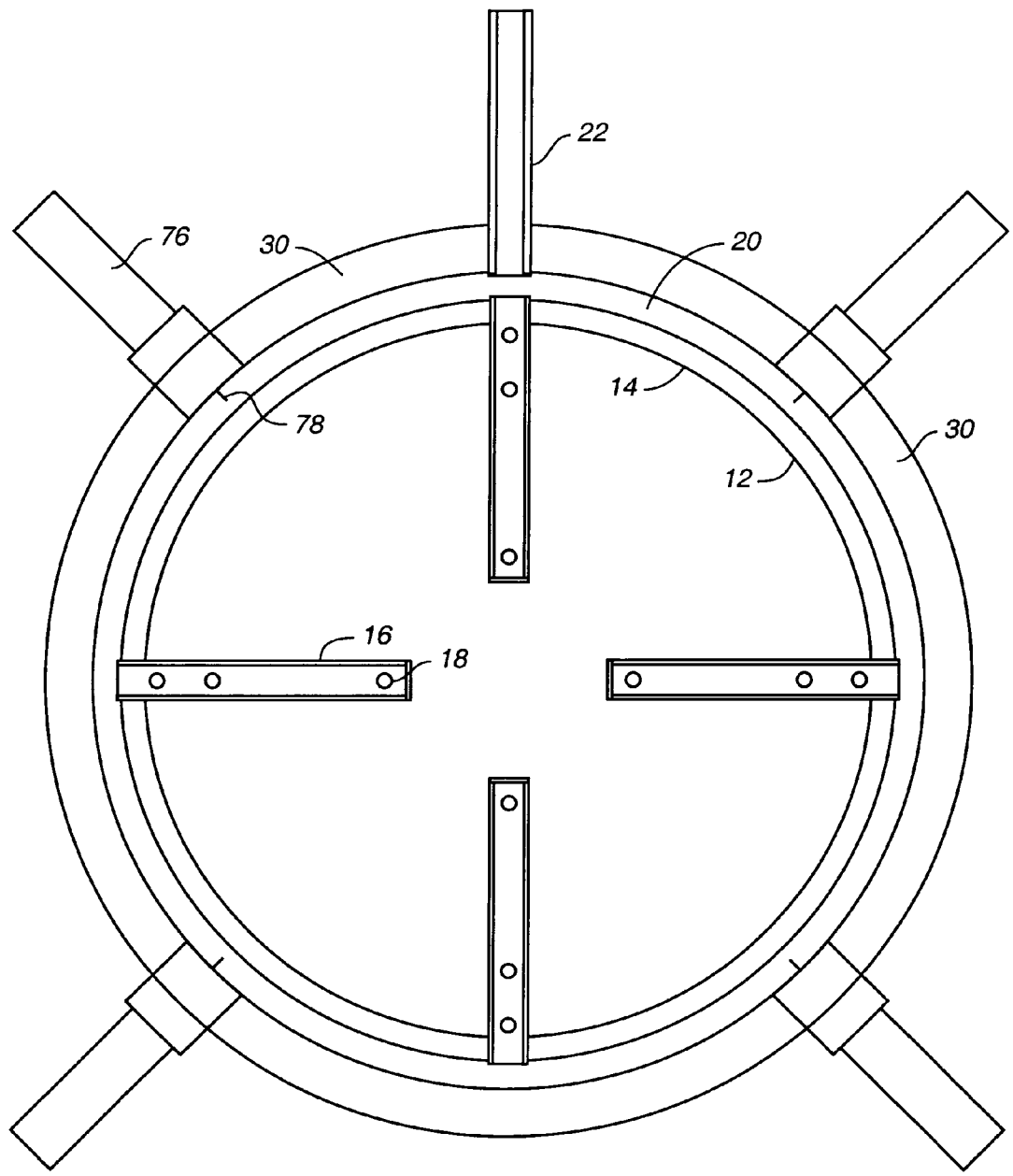
*FIG._15*

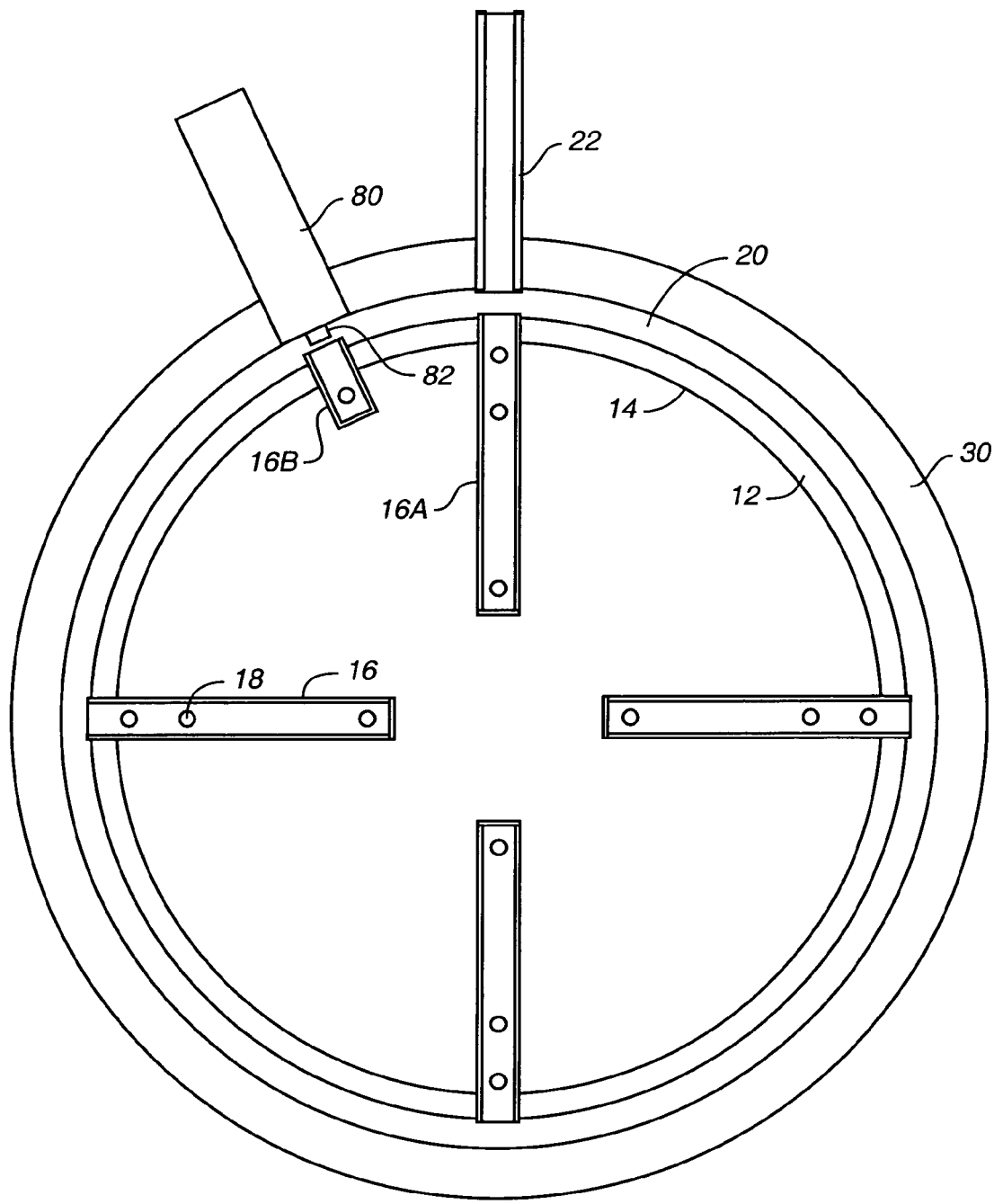
FIG._16

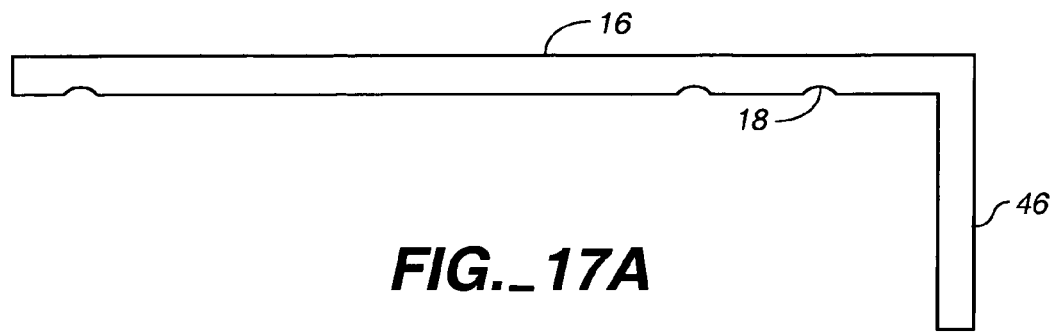
FIG._17A
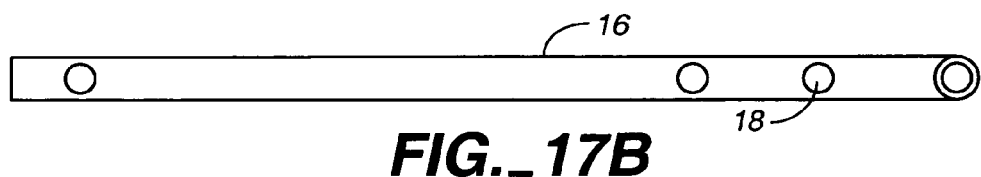
FIG._17B
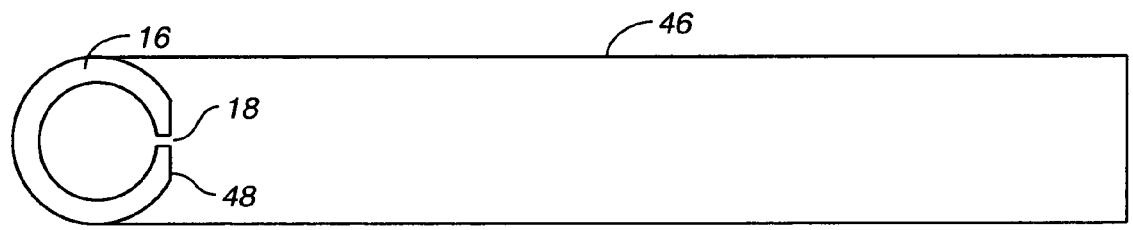
FIG._17C
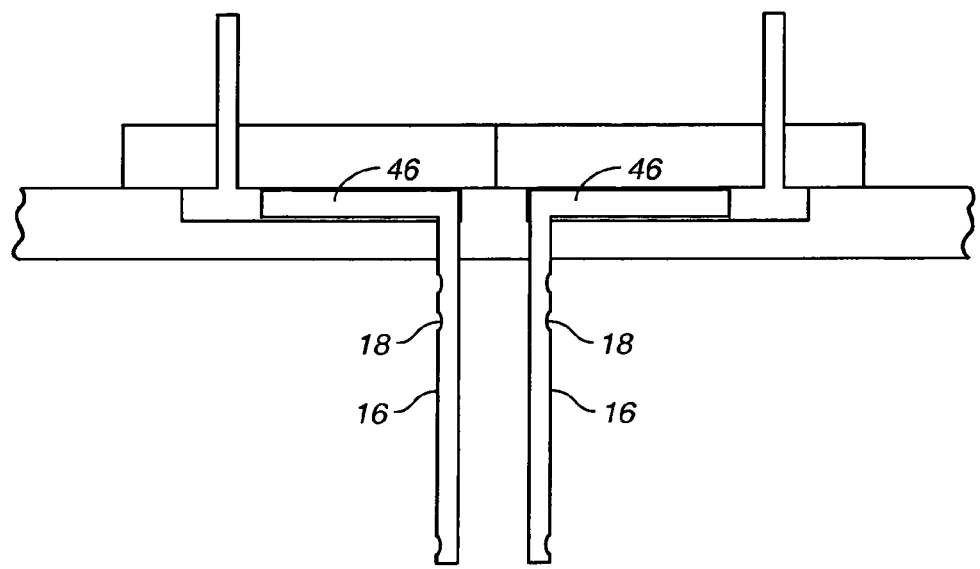
FIG._17D

METHOD AND APPARATUS FOR MEASUREMENT OF FLOW RATE

CROSS REFERENCE TO RELATED APPLICATIONS

The present application claims the benefit of the filing date of U.S. Provisional Patent Application Ser. No. 60/500,892, filed Sep. 4, 2003.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates generally to flow measuring devices, and more particularly to an improved method and apparatus for the measurement of flow rate. The inventive apparatus is in a class of flow measuring devices referred to as "pressure differential producers" and is based on the Pitot tube, specifically the averaging Pitot tube. An averaging Pitot tube contains a plurality of sensing ports on a single tube.

BACKGROUND INFORMATION AND DISCUSSION OF RELATED ART

U.S. Pat. No. 1,250,238 to Spitzglass for a Pitot Tube discloses a method of measuring fluids by means of a Pitot tube which transmits the pressure equivalent of the velocity of a fluid in a pipe or conduit to suitable outside means for indicating or recording the volume of fluid flowing through the conduit. The principal object of the invention is to provide an improved form of Pitot tube which transmits pressure difference actuated by the mean velocity of a fluid throughout the entire cross-sectional area of the pipe or conduit in contradistinction to the average velocity in the pipe.

U.S. Pat. No. 1,645,449 to Proebstel for a Multiple Pitot and Piezometer Tube for Measuring the Flow of Water through Closed Conduits teaches the taking of instantaneous readings of a plurality of Pitot nozzles placed within a closed conduit, and the use of a camera to record those readings.

U.S. Pat. No. 4,344,330 to Renken et al. for an Average Fluid Flow Sensor discloses a sensor for providing a differential pressure signal indicative of the average relative rate of flow of a fluid through a duct. Two tubular members are provided, each of which are formed in a loop oriented transverse to the fluid flow and each having a plurality of spaced-apart orifices along their length. In one of the tubular members, the orifices face upstream toward the impinging fluid flow; in the other, the orifices face downstream. The difference between the pressures developed within the two tubular members as a result of the orientation of these orifices relative to fluid flow is indicative of the average rate of fluid flow in the duct.

U.S. Pat. No. 5,123,288 to Tench et al. for an Averaging Pitot Probe teaches a flowmeter to measure speed of gas flow along a pipe comprising a gas flow sensor connected by tubing with an averaging Pitot probe formed by first and second tubes of circular cross-section disposed side by side and closed at their one and the same ends and mounted in a gas tight manner in the wall of the pipe. The two tubes are identical in shape and dimensions and each has four circular holes through its tube wall. All the holes are of the same shape and size, and each has a diameter in the range 0.4 mm to 1.00 mm. The internal diameter of each tube is at least 1.59 mm, and the ratio of the cross-sectional area of each tube to the cross-sectional area of each hole is at least 9:1. The positions of the holes in one tube are identical to the positions of the holes in the other tube except that the holes in the first tube face directly upstream with respect to the gas flow whilst the holes in the second tube face directly downstream. With respect to an imaginary plane P between the tubes, the first tube is symmetrical with the second tube. The speed of gas flow to be measured is preferably in the range of 0.3 to 10.00 m/s, and the gas is at or about atmospheric pressure.

U.S. Pat. No. 5,736,651 to Bowers for a High Temperature Gas Flow Sensing Element describes a sensing element having a housing with similar internal dimensions as the fluid conduit, whether round or rectangular. An interior flow conditioner is affixed at the inlet of the flow element. A total pressure sensing Pitot tube array is affixed traversing the interior cross sectional area of flow element for sensing the total pressure of fluid flowing into the flow element, and a static pressure sensing Pitot tube array is also affixed traversing the interior cross sectional area of the flow element for sensing the average static pressure within the flow element. The Pitot tubes and pressure sensing tubes are affixed at four places, two shell penetrations and two places at the manifolds, regardless of manifold design or the element shape. To prevent material stress and fatigue and leakage that can result from the different expansion rates of differing materials under high gradient temperature cycling, a high temperature packing, such as a ribbon packing or packing ring made of pliable material resistant to high temperatures, is used in place of the ferrule portion of a compression nut and fitting arrangement. Exterior first and second instrument taps are provide for connection of each array respectively to a differential pressure instrument for indicating flow rate and/or transmitting a flow rate signal. Further, exterior array access ports are provided to permit cleaning of each Pitot arrays should they become plugged with particulates.

U.S. Pat. No. 6,237,426 to Gryc et al. for an Airflow Sensor discloses an multi-point, center-averaging airflow sensor comprises a plurality of upstream airflow sensing tubes extending radially from a central hub having a total pressure averaging chamber and a static pressure averaging chamber. The airflow sensing tubes are each provided with at least one total pressure port located inwardly of the outer end of the tubes to minimize error caused by total pressure measurements taken near the inner walls of the conduit in which the sensor is installed. The sensor has static pressure ports located in the side surface of the hub which are shielded from upstream air flow by the tubes and which are preferably at least partially shielded from damper back pressure by notched reinforcing blades provided along the length of the airflow sensing tubes.

There are many prior designs that employ multiple averaging Pitot tubes that sample air pressures at multiple points within a bounded path, and average these multiple readings by providing fluid communication between all sensing ports to obtain a total average pressure, usually an impact pressure caused by gas impacting sensing ports facing the flow of gas, and a static pressure detected by sensing ports facing downstream of the flow of gas. These average pressures can be translated into average velocity and from velocity into average flow volume. Most prior art references specify a number of and spacing of sensing ports on the Pitot tubes in a manner to collect gas pressure samples from specific regions of the bounded path, as shown in the patents to Tench et al. and Spitzglass, supra. Most prior art references also use a centrally located chamber or plenum to collect the multiple point pressure readings into an average total pressure. Some terms used with the prior art are "multi-point center averaging," "branch averaging Pitot," and "plurality of pressure sensors."

There are numerous problems with these prior designs, including, but not limited to, the following:

1. The most important criteria when observing something is to do so without disturbing the object being observed. A flow velocity profile of a fluid or gas in a straight bounded path shows the highest velocity to be near the center of the path. This flow velocity profile is illustrated in FIG. 1 of the patent to Proebstel, and usually represents a "D" shape profile in a horizontal conduit. Any object in the center of, or crossing through the center of, a bounded path disturbs the flow where the flow velocity is usually greatest. This is the worst place to disrupt a flow path, and creates undesired turbulence. Turbulence usually adversely affects the performance of the flow measuring device and all supporting equipment (e.g., electronic pressure transducers).

2. As the temperature of the gas flow increases or decreases, the size of the bounded path may increase or decrease by thermal expansion of the materials used. With some prior art devices where opposing walls are mechanically connected by a pressure sensing structure (e.g., Gryc et al.) or supporting structure (e.g., Renken et al.), structural failure may result from unequal expansion of boundaries and connecting structures. Bowers addresses this expansion problem with a system of bushings that allow the boundary to move independently of other structures, but this can lead to changes in the critical distance between the outer-most sensing ports and the boundaries of the path where changes in velocity over distance from the boundary are greatest. These high levels of change in velocity over distance from the boundary are again illustrated in FIG. 1 of Proebstel, showing the "D" shape of a typical velocity profile of a fluid in a round conduit.

3. Pressure sensing ports that face oncoming particulated gasses are subject to clogging and damage from particles, causing false readings or rendering the device inoperable when attempting to measure particulated gasses. A grey medium can be defined as a gas or fluid containing essentially round shaped particles that do not have sticking, clinging or accumulative properties. Examples include sawdust, metal filings, plastic filings, sand, silt, and some types of smoke.

4. Most prior designs are fixed and cannot be customized during manufacture.

5. Most prior designs are mono-directional.

The foregoing patents reflect the current state of the art of which the present inventor is aware. Reference to, and discussion of, these patents is intended to aid in discharging Applicant's acknowledged duty of candor in disclosing information that may be relevant to the examination of claims to the present invention. However, it is respectfully submitted that none of the above-indicated patents disclose, teach, suggest, show, or otherwise render obvious, either singly or when considered in combination, the invention described and claimed herein.

BRIEF SUMMARY OF THE INVENTION

The method and apparatus for measurement of flow rate of this invention provides a bi-directional, clean or grey medium, wide temperature range, low intrusion, low turbulence, mass flow meter. The inventive apparatus extends multiple pressure sensing tubes, each containing multiple pressure sensing ports, into a bounded path in a semi-traversing fashion (here, semi-traversing can be defined as extending into a bounded path a distance no more than one half the diameter of the path). These sensing tubes sense impact or static pressures, depending on the direction of gas flow, to obtain a sensing pressure to the flow of gas within a bounded path. These sensing tubes are in fluid communication with a conduit, plenum or channel located externally of the bounded path which provides a total average sensing pressure for measurement. A series of reference pressure ports are located flush to the wall surface of the bounded path to obtain a reference pressure. These reference ports are in fluid communication with another conduit, plenum or channel also located externally of the bounded path which provides a total average reference pressure for measurement. The difference in total average sensing pressure and total average reference pressure can be measured and used to calculate the average velocity and volume of gas within the bounded path. Alternatively, the difference in total average pressures can produce a measurable sample flow through a channel connecting the two total average pressure plenums, which is proportional to the flow through the bounded path.

It is therefore an object of the present invention to provide a new and improved method and apparatus for measurement of flow rate.

It is another object of the present invention to provide a new and improved flow meter that creates minimal disturbance to the flow through the bounded path.

A further object or feature of the present invention is a new and improved flow meter that minimizes the effects of thermal expansion.

An even further object of the present invention is to provide a novel flow meter with pressure sensing ports that can be selectively oriented.

A still further object of the present invention is to provide a novel flow meter that is easily customized during manufacture.

Yet another object of the present invention is to provide a novel flow meter that enables bi-directional flow measurement.

Other novel features which are characteristic of the invention, as to organization and method of operation, together with further objects and advantages thereof will be better understood from the following description considered in connection with the accompanying drawing, in which preferred embodiments of the invention are illustrated by way of example. It is to be expressly understood, however, that the drawing is for illustration and description only and is not intended as a definition of the limits of the invention. The various features of novelty which characterize the invention are pointed out with particularity in the claims annexed to and forming part of this disclosure. The invention resides not in any one of these features taken alone, but rather in the particular combination of all of its structures for the functions specified.

There has thus been broadly outlined the more important features of the invention in order that the detailed description thereof that follows may be better understood, and in order that the present contribution to the art may be better appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of this application, which is measured by the claims, nor is it intended to be limiting as to the scope of the invention in any way.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

BRIEF DESCRIPTION OF THE SEVERAL VIEWS OF THE DRAWINGS

The invention will be better understood and objects other than those set forth above will become apparent when consideration is given to the following detailed description thereof. Such description makes reference to the annexed drawings wherein:

FIG. 1 is a side elevation cross-sectional view of a flow meter of this invention employing semi-traversing averaging Pitot tubes and surface static pressure reference ports;

FIG. 2 is an end elevation cross-sectional view of the flow meter of FIG. 1 taken along line 2—2 thereof;

FIG. 3 is an end elevation cross-sectional view of the flow meter of FIG. 1 taken along line 3—3 thereof;

FIG. 4 is a top plan view of a flow meter of this invention employing external total averaging channels machined into the body surface, and an optional sample flow channel or conduit between the total averaging channels;

FIGS. 5A–5F are end elevation views of various possible configurations of semi-traversing and other sensing tubes;

FIGS. 6A–6C are side elevation cross-sectional views of various modes of operation that are possible using semi-traversing sensing tubes;

FIGS. 6D–6E are side elevation cross-sectional views of different methods of measuring pressures produced by semi-traversing sensing tubes and surface static pressure reference ports;

FIGS. 7A–7B are side and end elevation views, respectively, of a semi-traversing Pitot tube with a locating member to be utilized as a guide for depth, spacing, and annular alignment of the sensing ports on the Pitot tube;

FIG. 7C is a top plan view of a Pitot tube used for static pressure sensing (with the sensing ports facing away from the direction of flow) with a flat surface machined on the sensing port side of the tube;

FIGS. 8A–8F are a series of views of semi-traversing averaging Pitot tubes with locating pin(s);

FIGS. 9A–9C are a series of views of semi-traversing averaging Pitot tubes with locating tube(s);

FIG. 10 is a top view plan of a flow measuring body illustrating channels machined into the body surface to accept the locating member of a semi-traversing Pitot tube;

FIGS. 11A–11C are side elevation cross-sectional views illustrating a machined channel for a semi-traversing Pitot tube, the installation of the semi-traversing Pitot tube, and the covering of the Pitot tube by a channel cover locking the Pitot tube into place;

FIG. 12 is a side elevation cross-sectional view illustrating a semi-traversing Pitot tube installed into an existing conduit or duct, using an external plenum;

FIG. 13 is a side elevation cross-sectional view illustrating a semi-traversing Pitot tube installed into an existing conduit using spacer blocks, fasteners and an external total averaging conduit;

FIG. 14 is a side elevation cross-sectional view of a high accuracy, low cost flow element of this invention constructed from PVC pipe and PVC slip couplings;

FIG. 15 is an end elevation view of a flow element illustrating the use of a hot-wire anemometer used to reduce turbulence;

FIG. 16 is an end elevation view of a flow element illustrating the use of a temperature sensor used to measure gas temperature; and FIGS. 17A–17D illustrate the incorporation of sensing ports on the opposite side of the sensing tubes.

DETAILED DESCRIPTION OF THE INVENTION

Referring to FIGS. 1 through 17, wherein like reference numerals refer to like components in the various views, there is illustrated therein a new and improved apparatus for measurement of flow rate, generally denominated 10 herein.

Referring to FIGS. 1–3, a typical example of a flow meter 10 comprises a hollow body herein referred to as a bounded path 12, bounded by walls 14. Velocity sensing stalks comprising semi-traversing sensing tubes 16 extend into the flow path in an semi-traversing fashion, and detect gas pressure created by the velocity of the gas, herein referred to as sensing pressure, through a plurality of apertures 18. The sensing tubes are in fluid communication by means of an external connecting conduit, plenum or channel 20 where the total average sensing pressure is accumulated and finally measured through a total average sensing pressure port 22.

The bounded path includes reference pressure ports 24 within the walls 14 of the path 12 that conduct the static gas pressure at the inner wall surface. The reference ports 24 are in fluid communication by means of an external connecting conduit, plenum or channel 26 where the total average reference pressure is accumulated and measured through a total average reference pressure port 28.

FIGS. 1–3 show an example where channels are machined into the outer surface of the bounded path walls 14 to form the total average sensing pressure channel 20 and the total average reference pressure channel 26. The channels are covered by a sleeve 30 for the sensing channel 20 and a sleeve 32 for the reference channel 26, and both sleeves are bonded to the outer surface of walls 14.

FIG. 4 is a top plan view of a flow meter of this invention employing external total averaging sensing pressure channel 20 and total averaging pressure channel 26 machined or otherwise incorporated into the body surface. Optional sample flow channel or conduit 34 is similarly machined or otherwise incorporated into the body surface between the total averaging channels 20, 26.

FIGS. 5A–5F are end elevation views of various possible configurations of semi-traversing and other sensing tubes. FIG. 5A illustrates an array of four equally spaced nominal (extending just less than one-half the diameter of the path) semi-traversing sensing tubes 16. FIG. 5B illustrates a symmetrical array of two nominal semi-traversing sensing tubes 16 and six shorter sensing tubes 36. FIG. 5C illustrates a symmetrical array of eight nominal semi-traversing sensing tubes 16. FIG. 5D illustrates a symmetrical array of four nominal semi-traversing sensing tubes 16 and four shorter sensing tubes 36. FIG. 5E illustrates an array of one extra-length (here extending generally one-half the diameter of the path) sensing tube 38 and seven shorter sensing tubes 36. FIG. 5F illustrates an array of one extra-length (here extending significantly greater than one-half the diameter of the path) sensing tube 38 and seven shorter sensing tubes 36.

FIGS. 6A–6C are side elevation cross-sectional views of various modes of operation that are possible using semi-traversing sensing tubes 16. FIG. 6A illustrates a unidirectional, clean gas impact/reference mode using semi-traversing sensing tubes 16 and surface static pressure reference ports 24. FIG. 6B illustrates a unidirectional, grey medium static/reference mode using semi-traversing sensing tubes 16 and surface static pressure reference ports 24. FIG. 6C illustrates a bidirectional, clean gas impact/static sensing mode using two sets of semi-traversing sensing tubes 16.

Sensing pressures can be evaluated in two different ways. FIG. 6D illustrates how the sensing pressure and reference pressure are measured as pressure differentials and is preferably performed with a differential pressure transducer 42. FIG. 6E illustrates how a flow "sample" is extracted from the bounded path and measured in a sample conduit 34, as shown in FIG. 4, formed between the impact pressure sensing tubes 16 and the reference ports 24. This sample flow is preferably measured with a flow measurement device 44 such as a hot wire anemometer, optical, or ultra-sonic method.

FIGS. 7A–7B are side and end elevation views, respectively, of a semi-traversing Pitot tube 16 with a locating member 46 to be utilized as a guide for depth, spacing, and annular alignment of the sensing ports on the Pitot tube.

FIG. 7C is a top plan view of a Pitot tube used for static pressure sensing (with the sensing ports 18 facing away from the direction of flow) with a flat surface 48 machined on the sensing port side of the tube. It has been determined that this flat surface improves the static pressure sensing.

FIGS. 8A–8F are a series of side and end views of semi-traversing averaging Pitot tubes 16 with locating pin(s) 50. These locating pins 50 can be used to facilitate alignment and insertion depth of the tube 16. The pins may fit into a channel on the path walls to anchor the tube and keep it in place.

FIGS. 9A–9C are a series of side views of semi-traversing averaging Pitot tubes 16 with locating tube(s) 52. As with the locating pins described above, these locating tubes 52 can be used to facilitate alignment and insertion depth of the Pitot tube 16. The locating tubes may fit into a channel on the path walls to anchor the Pitot tube and keep it in place.

FIG. 10 is a top view plan of a flow measuring body illustrating channels 54 machined into the body surface to accept the locating member 46 (FIG. 7A) of a semi-traversing Pitot tube. The Pitot tube itself extends into the path through hole 56.

FIGS. 11A–11C are side elevation cross-sectional views illustrating a machined channel 54 for a semi-traversing Pitot tube 16 with locating member 46, the installation of the semi-traversing Pitot tube, and the covering of the Pitot tube by a channel cover 56 locking the Pitot tube into place.

FIG. 12 is a side elevation cross-sectional view illustrating a semi-traversing Pitot tube 16 with locating member 46 installed into path 12 in the form of an existing conduit or duct. Here, channel 58 is formed in sleeve 60, and channel 62 is formed in sleeve 64, forming an external plenum.

FIG. 13 is a side elevation cross-sectional view illustrating a semi-traversing Pitot tube installed into path 12 in the form of an existing conduit using spacer blocks 66, fasteners 68 and an external total averaging conduit 70, including conduit boundary 72 and averaging port 74.

FIG. 14 is a side elevation cross-sectional view of a high accuracy, low cost flow element 10 of this invention such as may be constructed from inexpensive PVC pipe and PVC slip couplings. Here, PVC pipe forms the path 12 and wall 14, and a PVC slip coupling forms the sleeves 30, 32.

FIG. 15 is an end elevation view of a flow element illustrating the use of a hot-wire anemometer used to monitor turbulence. The external total averaging sensing channel, plenum, or conduit 20 can be used to measure turbulence levels in the gas flow through the bounded path 12 by measuring the flow between identical semi-traversing Pitot tubes 16. Everything being equal, and little or no turbulence in the flow of gas through the bounded path, there should be no flow of gas through the external total averaging conduit 20. Referring to FIG. 15, a high level of turbulence will create a flow of gas between equal Pitot tubes 16 that can be measured with hot wire anemometers 76 located between equal Pitot tubes 16 with the anemometer hot wire sensing elements 78 protruding into the external total averaging channel 20. Turbulence levels can be monitored during installation of a flow meter to position the meter in a system for optimal performance, design a system around a flow meter for optimal performance, or to calculate an error level for flow meter readings.

FIG. 16 is an end elevation view of a flow element illustrating the use of a temperature sensor used to measure gas temperature. The external total averaging sensing channel, plenum, or conduit 20 can be used to measure the temperature of the gas flowing through the bounded path 12. Referring to FIG. 16, a localized sample gas flow can be induced between two semi-traversing Pitot tubes of unequal length 16A and 16B. By placing a temperature sensor 80 between the unequal sized Pitot tubes with the temperature sensing element 82 protruding into the conduit 20, a sample of the gas flowing through the bounded path can be measured for temperature. Temperature readings can be used for corrections in flow readings due to gas density and thermal expansion or contraction of the bounded path.

FIGS. 17A–17D illustrate the incorporation of sensing ports on the opposite side of the sensing tubes from those previously illustrated. Here, apertures 18 are placed on the inside of the angle formed by the tube 16 and locating member 46. FIG. 17C is a top plan view illustrating a flat surface 48 machined on the sensing port side of the tube.

This provides another option in the placement of the external total averaging channels, and is useful in constructing bi-directional elements with the impact and static sensing tubes as close to each other as possible and in line with each other. FIG. 17D illustrates how a semi-traversing Pitot tube can be installed in very close proximity to, while inline with, opposing semi-traversing Pitot tubes in a bi-directional flow element. The opposing Pitot tubes can be positioned so as to almost contact each other if so desired. The closer all sensing items (Pitot tubes, reference ports) of the flow element are located to each other, the more linear and accurate the element.

Accordingly, the inventive method and apparatus addresses numerous problems of prior designs including, but not limited to, the following:

1. The semi-traversing pressure sensing tubes are preferably terminated prior to crossing the center of the bounded path, the area of greatest velocity. As shown in the drawings, this leaves the area of greatest velocity clear of any obstruction and undisturbed, rendering higher levels of accuracy of actual flow by creating minimal disruption to the gas flow, and creating little turbulence maintaining a high level of accuracy of the device and supporting devices. By observing the D shaped velocity profile, it can be seen that the sensing tubes can be terminated well short of the center of the flow path and still receive a good average pressure sample for that region of the path.
2. Using semi-traversing pressure sensing tubes, the sensing tubes move with the boundaries of a thermally expanding or contracting bounded path while maintaining the critical distance from the path boundaries and the outer most pressure sensing ports where changes in velocity are greatest. While the inner-most sensing ports near the center of the bounded path will move toward or away from the path center, the velocity profile shows relatively small changes in velocities over distance from the center of the path.
3. When measuring relatively clean gasses, the pressure sensing ports can be oriented facing the oncoming gas flow. The sensing tube ports are sensing impact pressure in this configuration and sensing pressure is greater than the reference pressure with a +sensing/reference pressure differential. When particulated gasses are measured (grey gas), the pressure sensing tube ports can be faced away from the oncoming gasses to protect the pressure sensing ports from particles or collisions with particles. The sensing tube ports are detecting static pressure in this configuration and the sensing pressure is less than the reference pressure producing a −sensing/reference pressure differential.
4. The inventive design can be custom assembled at manufacture using a variety of different lengths and number of sensing tubes. For instance, a six tube design can use six sensing tubes of equal length, or three long tubes reaching near the center of the flow path, and three short tubes to reduce the disruption of higher velocity areas of the path.
5. The inventive design allows bi-directional flow measurement by combining impact sensing tubes and static sensing tubes into one design.

Accordingly, the inventive apparatus may be characterized as an apparatus for measurement of flow rate including a bounded path having an inside wall surface and a diameter; a plurality of pressure sensing tubes, each pressure sensing tube containing multiple pressure sensing ports, extending into said bounded path a distance no more than one half the diameter of said bounded path, to obtain a sensing pressure to the flow of a gas within the bounded path; a first channel in fluid communication with the plurality of pressure sensing tubes and located externally of said bounded path to provide a total average sensing pressure for measurement; a plurality of reference pressure ports located flush to the bounded path wall surface, to obtain a reference pressure; and a second channel in fluid communication with the plurality of reference pressure ports and located externally of the bounded path to provide a total average reference pressure for measurement.

The inventive method may be characterized as a method for measurement of flow rate, including the steps of: providing a bounded path having an inside wall surface and a diameter; providing a plurality of pressure sensing tubes, each pressure sensing tube containing multiple pressure sensing ports; extending each pressure sensing tube into the bounded path a distance no more than one half the diameter of the bounded path, to obtain a sensing pressure to the flow of a gas within said bounded path; providing a first channel in fluid communication with the plurality of pressure sensing tubes and located externally of the bounded path to provide a total average sensing pressure for measurement; providing a plurality of reference pressure ports located flush to the bounded path wall surface, to obtain a reference pressure; and providing a second channel in fluid communication with the plurality of reference pressure ports and located externally of the bounded path to provide a total average reference pressure for measurement.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

For example, any of the following parameters may be changed or modified without departing from the spirit and scope of the invention: the number of the sensing tubes; the length of the sensing tubes; the combination of lengths of the sensing tubes (e.g., long ones and short ones in the same element, with perhaps one long one that traverses across the center of the path if desired); the cross-sectional shape of the sensing tubes, as required for the direction of use; the number of sensing ports or apertures on each sensing tube; the spacing of the sensing ports on the sensing tubes; the shape of the sensing ports (e.g., round, oval, square, or slits); the angle of the sensing tubes in relation to the walls; the number of reference ports; the positioning of the reference ports (e.g., spaced evenly, between the sensing tubes, inline with the sensing tubes, or in front of or directly behind the sensing tubes); the shape of the reference ports (e.g., round, oval, or slits); the orientation of the reference ports (e.g., perpendicular to walls, slanted, or angled); the cross sectional shape of the bounded path (e.g., circular, oval, or square); the method of the external connecting conduit (e.g., a channel machined into the path walls, a plenum circling the path walls, or a connecting conduit); and the length of the bounded path.

Therefore, the above description and illustrations should not be construed as limiting the scope of the invention, which is defined by the appended claims.

What is claimed as invention is:

1. An apparatus for measurement of flow rate, said apparatus comprising:
   a bounded path having an inside wall surface and a diameter;

a plurality of pressure sensing tubes, each pressure sensing tube containing multiple pressure sensing ports, extending into said bounded path a distance no more than one half the diameter of said bounded path, to obtain a sensing pressure to the flow of a gas within said bounded path;

a first channel in fluid communication with said plurality of pressure sensing tubes and located externally of said bounded path to provide a total average sensing pressure for measurement;

a plurality of reference pressure ports located flush to said bounded path wall surface, to obtain a reference pressure; and a second channel in fluid communication with said plurality of reference pressure ports and located externally of said bounded path to provide a total average reference pressure for measurement.

2. The apparatus for measurement of flow rate of claim 1 further including means for measuring the difference in total average sensing pressure and total average reference pressure to calculate the average velocity and volume of gas within the bounded path.

3. The apparatus for measurement of flow rate of claim 2 wherein said means for measuring the difference in total average sensing pressure and total average reference pressure comprises a differential pressure transducer.

4. The apparatus for measurement of flow rate of claim 1 further including a third channel connecting said first channel and said second channel, and means for measuring a sample flow through said third channel.

5. The apparatus for measurement of flow rate of claim 1 wherein said pressure sensing tubes include a locating member.

6. The apparatus for measurement of flow rate of claim 5 wherein said locating member comprises a locating pin.

7. The apparatus for measurement of flow rate of claim 5 wherein said locating member comprises a locating tube.

8. The apparatus for measurement of flow rate of claim 1 wherein at least one of said plurality of pressure sensing tubes is of a different length.

9. The apparatus for measurement of flow rate of claim 8 wherein said first channel includes means for measuring temperature of the flow of gas.

10. The apparatus for measurement of flow rate of claim 1 wherein said plurality of pressure sensing tubes measure static pressure.

11. The apparatus for measurement of flow rate of claim 1 wherein said plurality of pressure sensing tubes measure impact pressure.

12. The apparatus for measurement of flow rate of claim 1 wherein said first channel includes means to measure turbulence levels in the gas flow being measured.

13. The apparatus for measurement of flow rate of claim 12 wherein said means to measure turbulence levels comprises a hot wire anemometer.

14. A method for measurement of flow rate, said method comprising the steps of:

providing a bounded path having an inside wall surface and a diameter;

providing a plurality of pressure sensing tubes, each pressure sensing tube containing multiple pressure sensing ports;

extending each pressure sensing tube into the bounded path a distance no more than one half the diameter of the bounded path, to obtain a sensing pressure to the flow of a gas within said bounded path;

providing a first channel in fluid communication with the plurality of pressure sensing tubes and located externally of the bounded path to provide a total average sensing pressure for measurement;

providing a plurality of reference pressure ports located flush to the bounded path wall surface, to obtain a reference pressure; and providing a second channel in fluid communication with the plurality of reference pressure ports and located externally of the bounded path to provide a total average reference pressure for measurement.

* * * * *